(12) United States Patent
Kukita et al.

(10) Patent No.: US 8,334,752 B2
(45) Date of Patent: Dec. 18, 2012

(54) WIRELESS TAG, WIRELESS TAG COMMUNICATION SYSTEM, WIRELESS TAG ACCESS DEVICE, METHOD OF DETECTING CORRESPONDING WIRELESS TAGS AND COMPUTER READABLE MEDIUM

(75) Inventors: Shigezou Kukita, Tokyo (JP); Takahide Kawakami, Tokyo (JP); Koichi Sakanashi, Tokyo (JP); Fujio Deguchi, Tokyo (JP); Masayuki Muratani, Tokyo (JP); Masaru Nishijima, Tokyo (JP); Motoatsu Yoshikawa, Tokyo (JP); Shirou Nagata, Saitama (JP)

(73) Assignees: Oki Electric Industry Co., Ltd., Tokyo (JP); Oki Consulting Solutions Co., Ltd., Tokyo (JP)

( * ) Notice: Subject to any disclaimer, the term of this patent is extended or adjusted under 35 U.S.C. 154(b) by 981 days.

(21) Appl. No.: 12/155,675

(22) Filed: Jun. 6, 2008

(65) Prior Publication Data

US 2009/0002174 A1    Jan. 1, 2009

(30) Foreign Application Priority Data

Jun. 8, 2007 (JP) ................................. 2007-153167

(51) Int. Cl.
*H04Q 5/22* (2006.01)

(52) U.S. Cl. ................. 340/10.1; 340/572.1; 340/572.7; 340/572.8; 340/10.31; 340/10.4

(58) Field of Classification Search ......................... None
See application file for complete search history.

(56) References Cited

U.S. PATENT DOCUMENTS

| | | | | |
|---|---|---|---|---|
| 3,733,602 | A * | 5/1973 | Cuckler et al. | 342/27 |
| 5,565,858 | A * | 10/1996 | Guthrie | 340/10.33 |
| 6,847,856 | B1 * | 1/2005 | Bohannon | 700/115 |
| 2006/0066444 | A1 * | 3/2006 | Steeves | 340/10.5 |
| 2006/0148279 | A1 * | 7/2006 | German et al. | 439/49 |
| 2007/0176745 | A1 * | 8/2007 | Gibson et al. | 340/10.1 |
| 2008/0100467 | A1 * | 5/2008 | Downie et al. | 340/686.2 |

FOREIGN PATENT DOCUMENTS

| | | |
|---|---|---|
| JP | 10-289297 | 10/1998 |
| JP | 2003-317050 A | 11/2003 |
| JP | 2005-327104 | 11/2005 |

* cited by examiner

*Primary Examiner* — Benjamin C Lee
*Assistant Examiner* — Curtis King
(74) *Attorney, Agent, or Firm* — Rabin & Berdo, P.C.

(57) ABSTRACT

A wireless tag includes at least one of a signal radiation unit that radiates a first linking signal based on an instruction from a wireless tag access device, and a signal detection unit that detects a second linking signal that has been radiated and provides the second linking signal to the wireless tag access device.

4 Claims, 5 Drawing Sheets

WIRELESS TAG, WIRELESS TAG COMMUNICATION SYSTEM, WIRELESS TAG ACCESS DEVICE, METHOD OF DETECTING CORRESPONDING WIRELESS TAGS AND COMPUTER READABLE MEDIUM

CROSS-REFERENCE TO RELATED APPLICATION

This application claims priority under 35 USC 119 from Japanese Patent Application No. 2007-153167, the disclosure of which is incorporated by reference herein.

BACKGROUND OF THE INVENTION

1. Field of the Invention

The present invention relates to a wireless tag, a wireless tag communication system, a wireless tag access device, a method of detecting corresponding wireless tags and to a computer readable medium storing a program causing a computer to execute a process, for detecting corresponding wireless tags, and the invention being applicable to, for example, detecting a pair of corresponding wireless tags.

2. Description of the Related Art

Accompanying the widespread use of wireless tags, a utilization mode has been proposed in which, by providing a sensor function (for example, a temperature sensor, a distortion sensor, a pressure sensor, or the like) to a wireless tag, the results of sensing may be output in response to an inquiry from a wireless tag reader/writer (see, for example, Japanese Patent Application Laid-Open (JP-A) No. 10-289297 and JP-A No. 2005-327104).

However, in these conventional wireless tags having sensor functions, individual wireless tags can only output the individual results of sensing in response to an inquiry from a wireless tag reader/writer, and a pair of wireless tags cannot be operated while directly linked with each other.

In an apparatus in which many connectors are close to each other, a management technique has been studied in which identification data (ID) read out from wireless tags provided to the connectors is utilized in order to determine if a corresponding pair of connectors are correctly connected. In this case, if the wireless tags of the corresponding connectors could be linked to each other, and the pair of linked wireless tags could be recognized by a host unit that controls the wireless tag reader/writer, then the corresponding pair of connectors could be correctly apprehended and managed. However, with conventional wireless tags having sensor functions as described above, the wireless tags cannot be linked to each other, and therefore, other methods must be used to determine whether the corresponding pair of connectors are correctly connected.

Therefore, there is a desire for wireless tags that can be directly linked to each other. There is also a desire for a wireless tag communication system capable of detecting a pair or a set of linked wireless tags, a wireless tag access device, a method of detecting corresponding wireless tags, and a computer readable medium storing a program causing a computer to execute a process for detecting corresponding wireless tags.

SUMMARY OF THE INVENTION

The present invention provides wireless tags which can be directly linked with each other. The invention further provides a wireless tag communication system capable of detecting a pair or a set of wireless tags that are linked with each other, a wireless tag access device, a method of detecting corresponding wireless tags and a computer readable medium storing a program causing a computer to execute a process for detecting corresponding wireless tags.

A first aspect of the present invention provides a wireless tag that includes a signal radiation unit that radiates a first linking signal based on an instruction from a wireless tag access device, and a signal detection unit that detects a second linking signal that has been radiated and provides the second linking signal to the wireless tag access device.

A second aspect of the present invention provides a wireless tag communication system including one or more wireless tags and a wireless tag access device capable of accessing the one or more wireless tags present in the vicinity of the wireless tag access device, wherein:

(1) each wireless tag includes at least one of a signal radiation unit that radiates a first linking signal based on an instruction from the wireless tag access device and a signal detection unit that detects a second linking signal that has been radiated and provides the second linking signal to the wireless tag access device; and (2) the wireless tag access device includes:

(2-1) a vicinity tag managing unit that manages the identification data of one or more wireless tags present in the vicinity of the wireless tag access device;

(2-2) a radiation operation initiation unit that initiates radiation of the first linking signal from the signal radiation unit of any of the wireless tags that is waiting for correspondence;

(2-3) a signal detection tag search unit that searches for the wireless tag including the signal detection unit that has detected the first linking signal; and (2-4) a correspondence detection unit that detects a correspondence between the wireless tag that has radiated the first linking signal and is waiting for correspondence, and another wireless tag, based on a search result of the signal detection tag search unit.

A third aspect of the present invention provides a wireless tag access device capable of accessing to the wireless tags present in the vicinity of the wireless tag access device, wherein:

each wireless tag includes at least one of a signal radiation unit that radiates a first linking signal based on an instruction from the wireless tag access device, and a signal detection unit that detects the second linking signal that has been radiated and provides the second linking signal to the wireless tag access device; and the wireless tag access device includes:

(1) a vicinity tag managing unit that manages the identification data of the one or more wireless tags present in the vicinity of the wireless tag access device;

(2) a radiation operation initiation unit that initiates radiation of the first linking signal from the signal radiation unit of any of the wireless tags that is waiting for correspondence;

(3) a signal detection tag search unit that searches for a wireless tag including a signal detection unit that has detected the radiated linking signal; and (4) a correspondence detection unit that detects a correspondence between the wireless tag that has radiated the first linking signal and that is waiting for correspondence, and another wireless tag, based on a search result of the signal detection tag search unit.

A forth aspect of the present invention provides a method of detecting corresponding wireless tags that detects a correspondence between the wireless tags present in the vicinity of a wireless tag access device which is capable of accessing the wireless tags present in the vicinity thereof, wherein:

each wireless tag includes at least one of a signal radiation unit that radiates a first linking signal based on an instruction from the wireless tag access device and a signal detection unit that detects a second linking signal that has been radiated and provides the second linking signal to the wireless tag access device; and the wireless tag access device includes a vicinity tag managing unit, a radiation operation initiation unit, a signal detection tag search unit and a correspondence detection unit, wherein:

the vicinity tag managing unit manages the identification data of the one or more wireless tags present in the vicinity of the wireless tag access device;

the radiation operation initiation unit initiates radiation of the first linking signal from the signal radiation unit of any of the wireless tags that is waiting for being corresponded;

the signal detection tag search unit searches for the wireless tag including the signal detection unit that has detected the first linking signal; and the correspondence detection unit detects a correspondence between the wireless tag that has radiated the first linking signal and that is waiting for correspondence, and another wireless tag, based on a search results of the signal detection tag search unit.

A fifth aspect of the present invention provides computer readable medium storing a program causing a computer to execute a process for detecting corresponding wireless tags mounted at a wireless tag access device that detects a correspondence between the wireless tags present in the vicinity of the wireless tag access device, each wireless tag including at least one of a signal radiation unit that radiates a first linking signal based on an instruction from the wireless tag access device, and a signal detection unit that detects a linking signal that has been radiated and provides the second linking signal to the wireless tag access device, the process including:

managing the identification data of the one or more wireless tags present in the vicinity of the wireless tag access device;

radiating the first linking signal from the signal radiation unit of any of the wireless tags that is waiting for correspondence;

searching for the wireless tag including the signal detection unit that has detected the first linking signal; and detecting the correspondence between the wireless tag that has radiated the first linking signal and that is waiting for correspondence, and another wireless tag, based on a search result of the signal detection tag search unit.

DETAILED DESCRIPTION OF THE INVENTION

—Principal Embodiment—

A wireless tag, a wireless tag communication system, a wireless tag access device, a method of detecting corresponding wireless tags and a computer readable medium storing a program causing a computer to execute a process for detecting corresponding wireless tags will now be described according to an embodiment of the invention with reference to the drawings.

Configuration of a Wireless Tag Communication System

Figure 1:
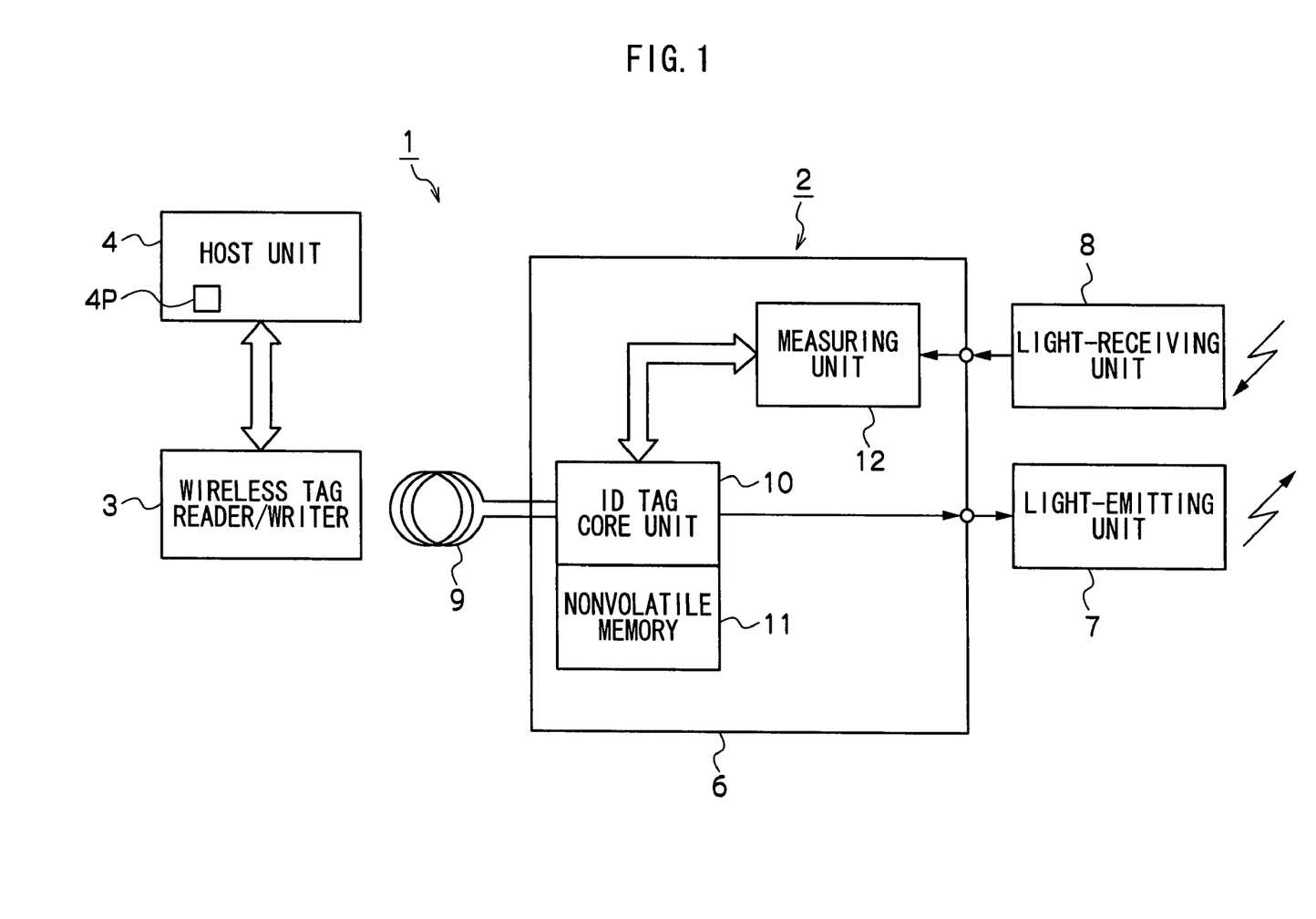
FIG. 1 is a block diagram illustrating units of a wireless tag communication system according to an embodiment.

FIG. 1 is a block diagram illustrating each unit of a wireless tag communication system according to an embodiment.

In FIG. 1, the wireless tag communication system 1 has a plurality of wireless tags 2, a wireless tag reader/writer 3 and a host unit 4. Here, the wireless tag access device includes the wireless tag reader/writer 3 and the host unit 4.

The wireless tag 2 may be, for example, an RFID tag having a wireless tag body 6, a light-emitting unit 7, a light-receiving unit 8 and an antenna 9. The wireless tag body 6 has an ID tag core unit 10, a nonvolatile memory 11 and a measuring unit 12.

The antenna 9 is, for example, a transmission/reception antenna (or may be separate ones for transmission and reception). The antenna 9 is, for example, of the type of resonating at a predetermined frequency as determined by the antenna coil and capacitance of an IC chip which forms the wireless tag body 6 (e.g., chip of an article No. ML 7216 manufactured by Oki Electric Industry Co., Ltd.), and efficiently takes out energy required for the operation of the wireless tag 2 relying on the resonance. That is, the wireless tag 2 of this embodiment is a passive wireless tag.

The ID tag core unit 10 is a unit with which the CPU or the wireless unit executes a general processing as a corresponding RFID tag. The ID tag core unit 10 demodulates a wireless signal trapped by the antenna 9 into a digital signal (serial signal), analyzes the digital signal (or the data obtained by the serial/parallel conversion of the digital signal), executes the processing corresponding to a query from the obtained wireless tag reader/writer 3, forms a response signal (e.g., including parallel data), modulates the response signal (or a signal obtained by the parallel/serial conversion of the response signal), and returns the signal back through the antenna 9.

The ID tag core unit 10, further, has a power source unit for obtaining a power source required for the operation of the wireless tag 2 from the wireless signal trapped by the antenna 9, and feeds the operation power source to each of the portions (FIG. 1 does not show power source feed lines).

The nonvolatile memory 11 is, for example, an FeRAM, and is storing the data such as ID assigned to the wireless tag 2 and a program to be executed by the ID tag core unit 10.

The light-emitting unit 7 includes, for example, a light-emitting element and a resistor, and emits light being controlled by the ID tag core unit 10. The light-emitting unit 7 may be, for example, the one that emits infrared light.

The light-receiving unit 8 includes, for example, a light-receiving element and a resistor, and outputs a signal (voltage signal) that varies depending upon the amount of received light. The wavelength band to which the light-receiving unit 8 corresponds is the same as the wavelength band of the light-emitting unit 7. For example, if the light-emitting unit 7 emits infrared light, then the light-receiving unit 8 exhibits sensitivity to the infrared light.

As will be described later, this embodiment is intended to detecting a pair of wireless tags, i.e., to detect a pair by having light emitted from the light-emitting unit 7 of one of the pair of wireless tags 2 received by the light-receiving unit 8 of the other one of the pair of wireless tags 2. In other words, it is desired that the emitted light is not exchanged among the wireless tags which are not forming pairs. In the use where pairs of wireless tags are arranged close to one another (see FIG. 2), therefore, it is desired that a communication-possible distance (distance in which light can be emitted and received) is short for the light-emitting unit 7 and for the light-receiving unit 8.

In FIG. 1, the light-emitting unit 7 and the light-receiving unit 8 are separate from the wireless tag body 6. The light-emitting unit 7 and the light-receiving unit 8, however, may be integral with the wireless tag body 6.

The measuring unit 12 obtains a measured result concerned to the amount of light received by the light-receiving unit 8, and gives the result to the ID tag core unit 10. The measuring unit 12 may by itself obtain the measured result concerned to the amount of received light, or may work in cooperation with the wireless tag access device so that the wireless tag access device obtains the data of the amount of received light.

The configuration of the latter measuring unit has been applied to, for example, an IC chip of an article No. ML 7216 manufactured by Oki Electric Industry Co., Ltd. That is, the measuring unit 12 includes an analog comparator and a variable threshold unit which varies the threshold value (threshold voltage) applied to the analog comparator being controlled by the wireless tag access device, and produces a logic "1" when the output of the light-receiving unit 8 is larger than the threshold value and produces a logic "0" when the output of the light-receiving unit 8 is smaller than the threshold value. The wireless tag access device executes the measurement multiple times while varying the threshold value, and obtains the digital data representing the amount of light received by the light-receiving unit 8.

The wireless tag reader/writer 3 has a hardware configuration same as the existing one, transmits a wireless signal modulated from a query signal to the wireless tag 2 being controlled by the host unit 4 connected, for example, through a wire or a wireless circuit, receives a wireless signal modulated from a response signal returned back from the wireless tag 2, and takes out the response signal through the demodulation processing. The query signal and the response signal are exchanged between the wireless tag reader/writer 3 and the wireless tag 2 in accordance with, for example, the standards of ISO 15693.

When, for example, the measuring unit 12 is the one that works in cooperation with the wireless tag access device, the wireless tag reader/writer 3 has the program for a measurement mode as a program for operation. When the host unit 4 instructs the initiation of operation of the measurement mode, the main control unit (not shown) in the wireless tag reader/writer 3 exchanges the query signal and the response signal relative to the wireless tag 2 according to the program of the measurement mode, obtains the digital data representing the amount of light received by the light-receiving unit 8, and gives the digital data to the host unit 4.

The host unit 4 corresponds, for example, to a personal computer which initiates an operation of the wireless tag reader/writer 3 to control the communication between the wireless tag reader/writer 3 and the wireless tag 2. In the case of this embodiment, the host unit 4 has a program 4P for detecting corresponding wireless tags (see FIGS. 4 and 5), and executes the program 4P for detecting the corresponding wireless tags to detect corresponding pairs successively out of a plurality of wireless tags 2.

Figure 2:
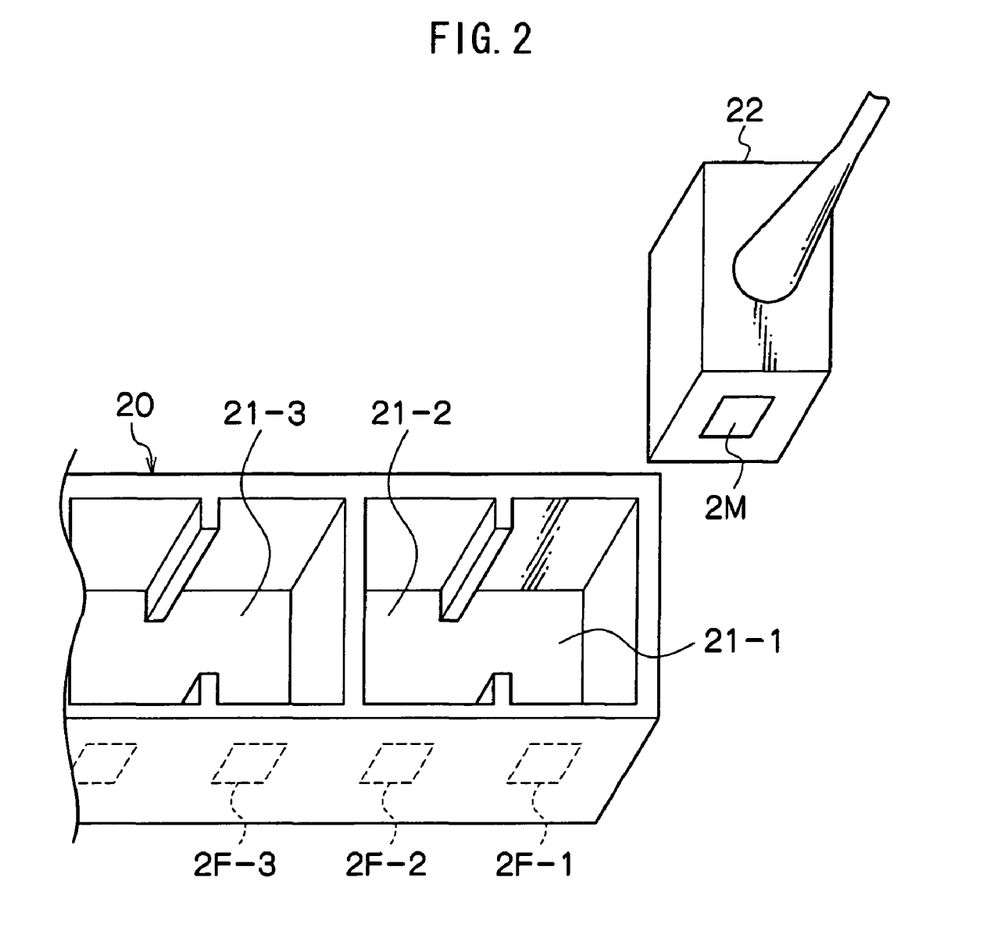
FIG. 2 is a schematic perspective view illustrating a use of the wireless tag communication system according to the embodiment.

FIG. 2 is a perspective view schematically illustrating the use of the wireless tag communication system according to the embodiment. A device has a connector member 20 with a plurality of female connector portions 21-1, 21-2, ... to which male connector portions 22 can be fitted. Wireless tags 2F-1, 2F-2, ... having the configuration closely illustrated in FIG. 1 are provided on the surfaces of the female connector portions 21-1, 21-2, ... . The wireless tag 2M having the configuration closely illustrated in FIG. 1 is also provided on one surface of the male connector portion 22. In a state where the male connector portion 22 is fitted into the female connector portion 21-n, the light-emitting unit 7 of the wireless tag 2M faces the light-receiving unit 8 of the wireless tag 2F-n, and the light-emitting unit 7 of the wireless tag 2F-n faces the light-receiving unit 8 of the wireless tag 2M.

The above program 4P for detecting corresponding wireless tags detects, for example, the facing wireless tags 2M and 2F-n in order to recognize the male connector portion 22 and the female connector portion 21-n fitted to each other. Here, the ID of the wireless tag 2 may be the one capable of distinguishing the male connector portion and the female connector portion from each other. Further, when the IDs of the wireless tags 2 are those that can be corresponded to the fitting position in a one-to-one manner, it is allowed to discriminate whether the connectors are properly fitted to each other.

Operation of a Wireless Tag Communication System

Described below is the operation of the wireless tag communication system 1 of this embodiment and, particularly, the operation for detecting a pair of wireless tags.

Figure 3:
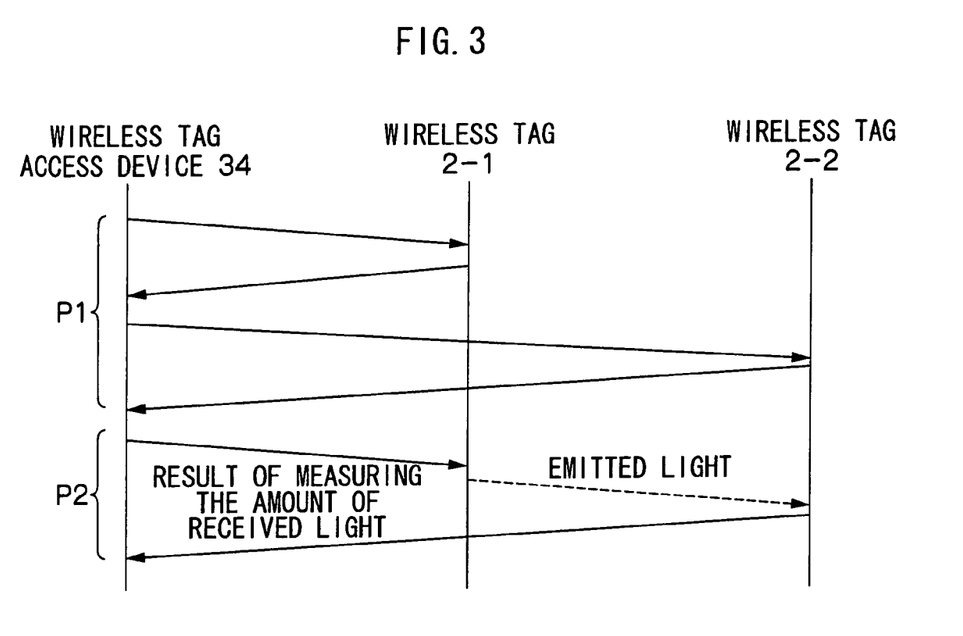
FIG. 3 is a sequence diagram illustrating the concept of operation for detecting a pair of wireless tags according to the embodiment.

Concept of the detection operation of this embodiment will be described with reference to a sequence diagram of FIG. 3. A wireless tag access device 34 (wireless tag reader/writer 3 and host unit 4) recognizes the wireless tags 2-1 and 2-2 present in the vicinity (phase P1). One wireless tag 2-1 whose presence is recognized is caused to emit light, and a wireless tag 2-2 that has received the emitted light is recognized to thereby detect a pair of wireless tags 2-1 and 2-2 (phase P2).

Figure 4:
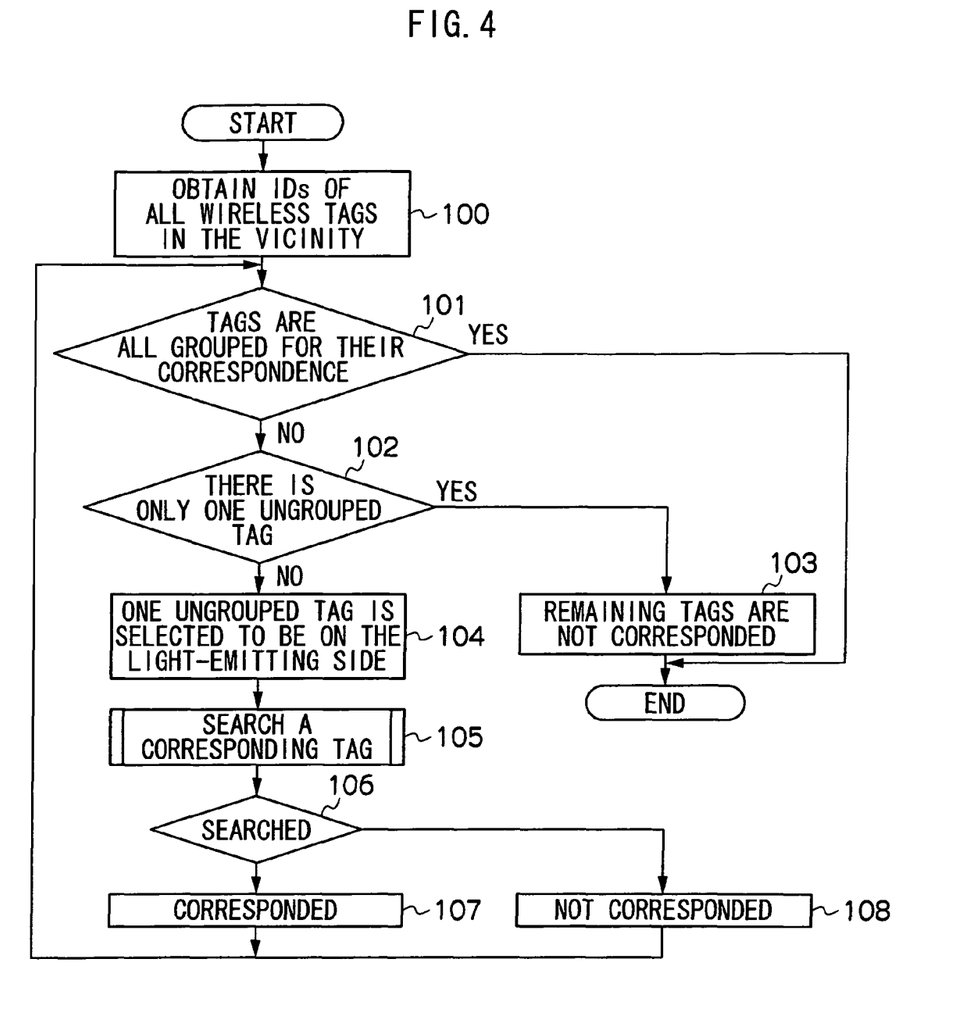
FIG. 4 is a flowchart illustrating the operation for detecting the pair of wireless tags according to the embodiment (part 1)
Figure 5:
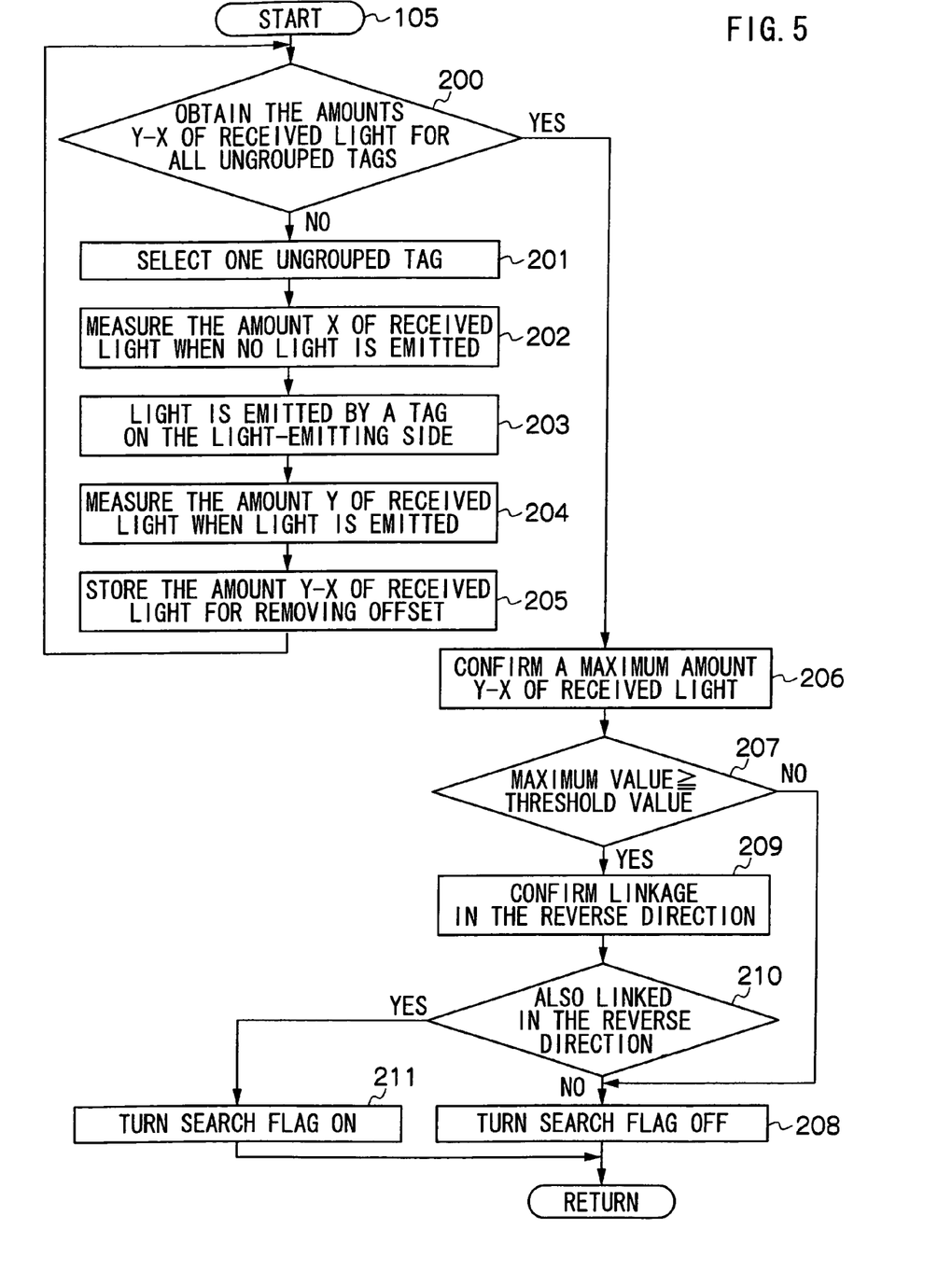
FIG. 5 is a flowchart illustrating the operation for detecting the pair of wireless tags according to the embodiment (part 2).

FIGS. 4 and 5 are flowcharts illustrating the operations for detecting a pair of wireless tags. FIGS. 4 and 5 can be regarded as showing the configuration of the program 4P for detecting corresponding wireless tags.

When, in the host unit 4, a series of processing shown in FIG. 4 is started by the operation by an operator, the wireless tag reader/writer 3 first, obtains the IDs of all wireless tags 2 present in a readable region (step 100). The obtained IDs are stored in an obtained-ID buffer. For example, a query signal having a command for transmitting ID is broadcast from the wireless tag reader/writer 3 to collect the IDs.

The host unit 4 confirms if the wireless tags having the obtained IDs are all grouped into those "which are not corresponded" and those "which are corresponded" (step 101). The confirmation is performed depending upon if the obtained-ID buffer is becoming empty or not. The ID of a wireless tag which is not forming a pair is moved from the obtained-ID buffer to a buffer which is not corresponding, while the ID of a wireless tag which is forming a pair is moved as pair data from the obtained-ID buffer to a buffer which is corresponding.

If the wireless tags that have obtained IDs are all grouped into those "which are not corresponded" or to those "which are corresponded", a series of processings shown in FIG. 4 ends.

If the wireless tags (IDs thereof) that are not grouped are remaining, the host unit 4 discriminates if the number of the ungrouped wireless tag is one (step 102). If the number of the ungrouped wireless tag is one, the ID of the wireless tag is moved from the obtained-ID buffer to a buffer that is not corresponded (step 103), and a series of processing shown in FIG. 4 ends.

If the number of the ungrouped wireless tags is two or more, the host unit 4 selects any of the ungrouped wireless tags (IDs thereof) to be the tags on the light-emitting side (step 104), and searches the wireless tags (tags on the light-receiving side) corresponding to the tags on the light-emitting side (step 105). The host unit 4 discriminates if the tags are searched (step 106). If the tags are searched, the IDs of the searched wireless tags forming pairs are moved as pair data from the obtained-ID buffer to the buffers that are corresponding (step 107). If the tags are not searched, the IDs of the tags on the light-emitting side are moved from the obtained-ID buffer to the buffers that are not corresponding (step 108) and, thereafter, the routine returns back to step 101.

FIG. 5 is a flowchart illustrating in detail the processing for searching the tags on the light-receiving side at step 105 in FIG. 4.

The host unit 4 discriminates if the ungrouped wireless tags, excluding the tags on the light-emitting side, are all measured for their amounts of received light to remove offset (step 200).

If the ungrouped wireless tags are remaining without being measured for their amounts of received light for removing offset, any one of them is selected for measurement (step 201) and is measured for its amount of received light (referred to here as X) when no light is being emitted (step 202). The host unit 4 inserts the ID of the wireless tag to be measured as an ID for specifying another wireless tag for communication, and has the wireless tag reader/writer 3 transmits a query signal having a command for finding the amount of measurement of the measuring unit 12 to thereby measure the amount X of received light. The measuring unit 12 produces the magnitude of a voltage signal input to the measuring unit 12. Therefore, the host unit 4 converts the magnitude thereof into the amount of received light, as required. Further, an average value of a plurality of measured values (or any other representative value) may be obtained as the amount X of received light. It is, further, desired that the measurement is taken in the same time as a window period that will be described later.

Thereafter, the host unit 4 has the tag on the light-emitting side emits light and measures the amount of light (amount of received light when light is emitted, referred to here as Y) received by the wireless tag that is to be measured in the window period within the light-emitting period (steps 203, 204). For example, the host unit 4 inserts the ID of the tag on the light-emitting side as an ID for specifying another wireless tag for communication, and has the wireless tag reader/writer 3 transmit a query signal having a command for turning on the power source to the light-emitting unit 7. After elapse of a predetermined period of time, the host unit 4 inserts the ID of the tag on the light-emitting side as an ID for specifying another wireless tag for communication, and has the wireless tag reader/writer 3 transmit a query signal having a command for turning off the power source to the light-emitting unit 7 to emit light for only a predetermined period of time. The amount Y of light received when light is emitted is obtained from the wireless tag that is to be measured in the same manner as obtaining the amount X of received light when no light is emitted.

The host unit 4 stores a value Y-X obtained by subtracting the amount X of received light when no light is emitted from the amount Y of received light when light is emitted as the amount of received light for receiving offset of the wireless tag that is to be measured now (step 205), and the routine returns back to step 200 described above.

Depending upon the environment surrounding the wireless tag 2, it may happen that sunlight or ray of light from a lamp in a room, or disturbance light such as reflected light thereof may fall on the light-receiving unit 8. Therefore, the amount X of received light when no light is emitted is obtained and is subtracted to preclude the influence of disturbance light. Further, the host unit 4 executes the amount of light received by the wireless tag to be measured in the window period which is within the period in which light is emitted by the tag on the light-emitting side to thereby preclude the influence of disturbance light.

After having measured the amount of received light for removing offset for all of the ungrouped wireless tags other than the tags on the light-emitting side, the host unit 4 recognizes a maximum value among them (step 206) and discriminates if a maximum value is greater than a threshold value which is for deciding that a pair is formed (step 207).

When the maximum value is smaller than the threshold value, the host unit 4 turns the search flag off (step 208) and returns back to the main routine. The search flag that is turned off means that no wireless tag is searched that forms a pair with the present tag on the light-emitting side.

When the maximum value is larger than the threshold value, the host unit 4 confirms the formation of the pair by exchanging the emitted light in the reverse direction regarding the wireless tag having the maximum amount of received light for removing offset as the tag on the light-emitting side and regarding the tag on the light-emitting side as the tag on the light-receiving side (steps 209, 210). Also in this case, the disturbance light is excluded, and it is so decided that formation of a pair is confirmed if the amount of received light after the disturbance light is excluded is greater than the threshold value. The confirmation in the reverse direction may be omitted. Namely, the confirmation in the reverse direction may be performed only when the result of whether the maximum value in the forward direction is for pair forming is in a predetermined range which is too close to the threshold value to make the decision.

When the formation of pair cannot be confirmed by exchanging the emitted light in the reverse direction, the routine proceeds to step 208 described above and where the search flag is turned off, and the main routine is resumed.

When the formation of a pair can be confirmed by exchanging the emitted light in the reverse direction, the search flag is turned on, the ID of a wireless tag having the maximum amount of received light for removing offset is set to the register for storing the ID of a corresponding wireless tag (step 211), and the main routine is resumed.

Through the above detection operation illustrated in FIGS. 4 and 5, the host unit 4 detects what ID is possessed by the wireless tag 2 that is present and how the wireless tags 2 are forming a pair.

It is also allowable to provide an operation mode which confirms that if the wireless tags that are detected to have been forming a pair are still forming a pair at present. For example, the host unit 4 sets the wireless tag of one ID in the stored data of the pair of IDs to be the one on the light-emitting side, and discriminates if light emitted from the above wireless tag has been received in a sufficient amount by the wireless tag of the other ID, to thereby confirm if the pair has been formed even at the present moment.

Further, in the case of confirming the above-mentioned connector connections, if pair data of the wireless tags corresponding to the connectors are stored, it becomes possible to detect erroneous connection of connectors or the detached connectors upon collation with the content of detecting the wireless tag pairs of this time.

According to the above embodiment, each wireless tag is provided with the light-emitting unit and the light-receiving unit. Therefore, the wireless tags can be directly linked to each other upon exchanging the ray of light. Here, the amount of received light is obtained when no light is emitted, the amount of received light when light is emitted is corrected, and a window period is set in synchronism with the period of emitting light as a period for measuring the amount of received light when light is emitted. Therefore, the influence of disturbance light is precluded and linkage can be confirmed.

Upon searching the linked wireless tags, the wireless tags forming the pair can be detected.

Here, in order to detect the wireless tags forming a pair, the measuring unit 12 may produce a binary signal representing if the light-receiving unit 8 is receiving light, and the binary signal may represent the reception of light. In this case, the wireless tag on the light-emitting side and the wireless tag on the light-receiving side may be regarded to be forming a pair (this is another embodiment of the present invention).

In a condition where many wireless tags are arranged close to each other, however, it may happen that light emitted from a wireless tag is received by a wireless tag that is not forming a pair. Depending upon the environment in which the invention is used, therefore, it is desired to decide if the pair is formed depending upon the amount of the received light as described in the above embodiment rather than depending upon if light is received.

Other Embodiments

In the description of the above embodiment, a modified embodiment is referred to. However, the following modified embodiment can be exemplified.

The data transfer system between the wireless tag reader/writer and the wireless tags may be any one of an electromagnetically coupled system or a microwave system that has now been employed for the existing wireless tags. The wireless tags used here are those without mounting a cell. However, the wireless tags may be those mounting a cell.

In the above embodiments, the wireless tags are all provided with the light-emitting unit and the light-receiving unit. However, the invention can be further applied to detecting wireless tags forming a pair even when the wireless tags have the light-emitting unit only or the wireless tags have the light-receiving unit only. In collecting the IDs of the wireless tags in this case, the wireless tag access device may pick up the wireless tags having either the light-emitting unit or the light-receiving unit, and may recognize those wireless tags as the ones to be operated on the light-emitting side and as the ones to be operated on the light-receiving side depending upon the picked-up results.

In the above embodiments, the host unit 4 collects and manages the IDs of wireless tags 2 in the vicinity of the wireless tag reader/writer 3. Here, however, the host unit 4 may be the one which manages the IDs of the wireless tags 2 in the vicinity in a fixed manner, or may set the IDs of the wireless tags 2 in the vicinity of the wireless tag reader/writer 3 to the host unit 4 from an external unit (input device or communication device).

In the above embodiments, the wireless tags are those which simply emit light but may be those which flash according to an intermittent pattern like PWM (pulse width modulation). The intermittent pattern may be a pattern specific to the wireless tags stored in the nonvolatile memory 11 of the wireless tags, or may be supplied each time from the wireless tag access device. In the case of the wireless tag body having a digital input terminal, a light-receiving pattern (intermittent pattern) from the light-receiving unit may be taken in from the digital input terminal and may be input to the ID tag core unit 10 without passing through the measuring unit 12. The intermittent pattern may be imparted with meaning as information.

When a region where it is desired to detect the pair of wireless tags is wider than a region which is managed by one wireless tag reader/writer, a plurality of wireless tag readers/writers may be corresponded thereto being arranged in the same host unit, or a single wireless tag reader/writer may be moved so as to be corresponded thereto.

In the above embodiments, the wireless tags are linked together by a ray of light. However, the wireless tags may be directly linked with each other by sound waves. The sound waves emitted from a wireless tag reach a plurality of wireless tags more than when light is used as a medium. In this case, the pair may be detected based on a maximum received value, or the pair may be detected by regarding the wireless tags whose received values are exceeding a predetermined threshold value as the wireless tags of the same set (group).

Division of functions of the wireless tag reader/writer 3 and the host unit 4 is not limited to the one of the above embodiments only. Further, the wireless tag access device may be formed by integrating the wireless tag reader/writer 3 and the host unit 4 together.

What is claimed is:

1. A wireless tag communication system, comprising:
first and second wireless tags of a plurality of wireless tags, and
a wireless tag access device capable of accessing the first and second wireless tags when the first and second wireless tags are present in the vicinity of the wireless tag access device, wherein
each one of the first and second wireless tags includes
a first wireless transmission and reception device for communication with the wireless tag accessing device, a signal for the communication including identification data of the one of the first and second wireless tags, and
a second wireless transmission and reception device for communicating with the other of the first and second wireless tags, the second wireless transmission and reception device being separate from the first wireless transmission and reception device, and including
a signal radiation unit configured to radiate a first linking signal based on an instruction from the wireless tag access device, and
a signal detection unit configured to detect a second linking signal radiated by the other wireless tag, and to provide the second linking signal to the wireless tag access device; and
the wireless tag access device comprises:
a radiation operation initiation unit that initiates radiation of a linking signal, from the signal radiation unit of the first wireless tag that is waiting for correspondence, for pairing the first and second wireless tags, the linking signal being independent from the signal for communication;
a signal detection tag search unit that searches for the second wireless tag of which the signal detection unit that has detected said linking signal radiated from the first wireless tag;
a correspondence detection unit that detects a correspondence between the first wireless tag that has radiated the linking signal and is waiting for correspondence, and the second wireless tag, based on a search result of the signal detection tag search unit; and
a vicinity tag managing unit that manages, when the first and second wireless tags are present in the vicinity of the wireless tag access device and are paired via the linking signal, a pair of identification data including the identification data of the paired first and second wireless tags; wherein the signal radiation unit is a light emitter, the signal detection unit is a light receiver, and the first and second linking signals are light signals.

2. A wireless tag access device capable of accessing first and second wireless tags, among a plurality of wireless tags, present in the vicinity of the wireless tag access device, each one of the first and second wireless tags having
    a first wireless transmission and reception device for communication with the wireless tag accessing device, a signal for the communication including identification data of the one of the first and second wireless tags, and
    a second wireless transmission and reception device for communicating with the other of the first and second wireless tags, the second wireless transmission an reception device being separate from the first wireless transmission and reception device, and including
        a signal radiation unit configured to radiate a first linking signal based on an instruction form the wireless tag access device, and
        a signal detection unit configured to detect a second linking signal to the wireless tag access device,
the wireless tag access device comprising:
    a radiation operation initiation unit that initiates radiation of a linking signal, from the signal radiation unit of the first wireless tags that is waiting for correspondence, for pairing the first and second wireless tags, the linking signal being independent from the signal for communication;
    a signal detection tag search unit that searches for the second wireless tag of which the signal detection unit has detected said linking signal radiated from the first wireless tag;
    a correspondence detection unit that detects a correspondence between the first wireless tag that has radiated the linking signal and is waiting for correspondence, and the second wireless tag, based on a search result of the signal detection tag search unit; and
    a vicinity tag managing unit that manages, when the first and second wireless tags are present in the vicinity of the wireless tag access device and are paired via the linking signal, a pair of identification data including the identification data of the paired first and second wireless tags; wherein the signal radiation unit is a light emitter, the signal detection unit is a light receiver, and the first and second linking signals are light signals.

3. A method of detecting corresponding first and second wireless tags, among a plurality of wireless tags, present in the vicinity of a wireless tag access device, each one of the first and second wireless tags having
    a first wireless transmission and reception device for communicating with the wireless tag accessing device, a signal for the communication including identification data of the one of the first and second wireless tags, and
    a second wireless transmission and reception device for communicating with the other of the first and second wireless tags, the second wireless transmission and reception device being separate from the first wireless transmission and reception device, and including
        a signal radiation unit configured to radiate a first linking signal based on an instruction from the wireless tag access device, and
        a signal detection unit configured to detect a second linking signal radiated by the other wireless tag, and to provide the second linking signal to the wireless tag access device, and
the wireless tag access device comprises a vicinity tag managing unit, a radiation operation initiation unit, a signal detection tag search unit and a correspondence detection unit, the method comprising
    initiating, by the radiation operation initiation unit, radiation of a linking signal from the signal radiation unit of the first wireless tag that is waiting for correspondence for pairing the first and second wireless tags, the linking signal being independent from the signal for communication;
    searching, by the signal detection tag search unit, for the second wireless tag of which the signal detection unit has detected said linking signal radiated from the first wireless tag;
    detecting, by the correspondence detection unit, the correspondence between the first wireless tag that has radiated the linking signal and that is waiting for correspondence, and the second wireless tag, based on a search result of the signal detection tag search unit; and
    managing, by the vicinity tag managing unit when the first and second wireless tags are present in the vicinity of the wireless tag access device and are paired via the linking signal, a pair of identification data including the identification data of the paired first and second wireless tags; wherein the signal radiation unit is a light emitter, the signal detection unit is a light receiver, and the first and second linking signals are light signals.

4. A non-transitory computer readable medium storing a program causing a computer to execute a process for detecting corresponding first and second wireless tags, among a plurality of wireless tags, present in the vicinity of a wireless tag access device, each one of the first and second wireless tags having
    a first wireless transmission and reception device for communicating with the wireless tag accessing device, a signal for the communication including identification data of the one of the first and second wireless tags, and
    a second wireless transmission and reception device for communicating with the other of the first and second wireless tag, the second wireless transmission and reception device being separate from the first wireless transmission and reception device, and including
        a signal radiation unit configured to radiate a first linking signal based on an instruction from the wireless tag access device, and
        a signal detection unit configured to detect a second linking signal radiated by the other wireless tag, and to provide the second linking signal to the wireless tag access device,
the process comprising
    radiating a linking signal, from the signal radiation unit of the first wireless tag that is waiting for correspondence, for pairing the first and second wireless tags, the linking signal being independent from the signal for communication;
    searching a linking signal, for pairing the first and second wireless tags, the linking signal being independent from the signal for communication;

searching for the second wireless tag of which of the signal detection unit has detected said linking signal radiated from the first wireless tag;

detecting the correspondence between the first wireless tag that has radiated the linking signal and that is waiting for correspondence, and the second wireless tag, based on a search result of the signal detection tag search unit; and managing, by the vicinity tag managing unit when the first and second wireless tags are present in the vicinity of the wireless tag access device and are paired via the linking signal, a pair of identification data including the identification data of the paired first and second wireless tags; wherein the signal radiation unit is a light emitter, the signal detection unit is a light receiver, and the first and second linking signals are light signals.

* * * * *